United States Patent
Grove et al.

(10) Patent No.: US 12,497,302 B2
(45) Date of Patent: Dec. 16, 2025

(54) SYSTEM AND METHOD FOR MANUFACTURING ALUMINUM CHLOROHYDRATE

(71) Applicant: CHEMTRADE SOLUTIONS LLC, Parsippany, NJ (US)

(72) Inventors: Levi James Grove, Fairview Heights, IL (US); Larry D. Timberlake, St. Louis, MO (US)

(73) Assignee: CHEMTRADE SOLUTIONS LLC, Parsippany, NJ (US)

( * ) Notice: Subject to any disclaimer, the term of this patent is extended or adjusted under 35 U.S.C. 154(b) by 694 days.

(21) Appl. No.: 17/795,855

(22) PCT Filed: Feb. 5, 2021

(86) PCT No.: PCT/US2021/016751
§ 371 (c)(1),
(2) Date: Jul. 27, 2022

(87) PCT Pub. No.: WO2021/158873
PCT Pub. Date: Aug. 12, 2021

(65) Prior Publication Data
US 2023/0073103 A1    Mar. 9, 2023

Related U.S. Application Data

(60) Provisional application No. 62/971,145, filed on Feb. 6, 2020.

(51) Int. Cl.
*C01F 7/57*    (2022.01)
*C01F 7/786*    (2022.01)

(52) U.S. Cl.
CPC ............... *C01F 7/57* (2022.01); *C01F 7/786* (2022.01); *C01P 2004/32* (2013.01); *C01P 2004/60* (2013.01)

(58) Field of Classification Search
None
See application file for complete search history.

(56) References Cited

U.S. PATENT DOCUMENTS 3,891,745 A    6/1975  Bellan et al.
5,356,609 A *  10/1994 Giovanniello ............ C01F 7/48
                                                        424/68
2016/0074873 A1   3/2016  Wonder

FOREIGN PATENT DOCUMENTS

| EP | 530598 A1 * | 3/1993 | ............... C01B 3/08 |
| WO | WO-2017009667 A1 * | 1/2017 | ............. C01B 21/48 |
| WO | 2019169381 | 9/2019 | |

OTHER PUBLICATIONS

English translation of EP-530598-A1. (Year: 1993).*
(Continued)

*Primary Examiner* — Anthony J Zimmer
*Assistant Examiner* — Zachary John Baum
(74) *Attorney, Agent, or Firm* — Polsinelli PC

(57) ABSTRACT

A method and system for batch manufacturing aluminum chlorohydrate (ACH) utilizing a reactor tank. The method comprises conducting two consecutive batch manufacturing processes, each batch manufacturing process producing aluminum chlorohydrate (ACH) by reacting solid-state aluminum metal pieces with an acid source in a reactor tank. Proximate the end of a first of the two batch manufacturing processes, after the aluminum chlorohydrate (ACH) being produced in that batch has reached a predetermined basicity level, a majority of the produced aluminum chlorohydrate (ACH) is withdrawn from the reactor tank but a heel-portion of the produced aluminum chlorohydrate (ACH) is retained in the reactor tank. The heel-portion comprises a sufficient amount of the produced aluminum chlorohydrate (ACH) to submerge therein a majority of unreacted solid-state aluminum metal pieces retained in the reactor tank at the time that (Continued)

HCl Process Results Using a Heel with a Hydration Floor

| Batch No. | Final Sample Analysis | | | | Rx'n Time, hr |
|---|---|---|---|---|---|
| | %Al₂O₃ | %Cl | %Basicity | NTU | |
| 1 | 21.06 | 9.46 | 78.46 | 19.7 | 35.7 |
| 2 | 21.25 | 9.47 | 78.64 | 23.8 | 27.6 |
| 3 | 23.45 | 9.94 | 79.68 | 26.9 | 27.0 |
| 4 | 23.16 | 10.03 | 79.24 | 25.8 | 22.0 |
| 5 | 21.93 | 9.43 | 79.41 | 25.8 | 20.0 |
| 6 | 21.22 | 9.73 | 78.02 | 33.0 | 15.0 |
| 7 | 22.54 | 10.26 | 78.18 | 31.8 | 16.0 |
| 8 | 24.16 | 9.98 | 80.20 | 26.8 | 17.5 |
| 9 | 24.73 | 9.73 | 83.08 | 43.4 | 22.0 |
| 10 | 22.54 | 9.63 | 79.52 | 30.3 | 21.2 |
| 11 | 23.88 | 10.09 | 79.75 | 30.0 | 21.1 |
| 12 | 23.06 | 9.24 | 80.79 | 26.6 | 21.3 |
| 13 | 23.03 | 9.70 | 79.80 | 26.0 | 17.5 |
| 14 | 25.64 | 10.67 | 80.05 | 37.6 | 17.3 |
| 15 | 22.09 | 9.70 | 78.95 | 46.2 | 15.0 |
| 16 | 22.02 | 9.19 | 79.79 | 38.5 | 24.1 |
| 17 | 22.14 | 9.25 | 79.97 | 27.9 | 21.3 |
| 18 | 23.63 | 9.87 | 79.97 | 36.2 | 20.3 |
| 19 | 22.10 | 9.31 | 79.81 | 32.4 | 19.0 |
| | | | AVE | 31.0 | 21.1 |
| | | | STDEV | 6.84 | 4.99 |
| | | | 95% CI | 3.1 | 2.2 |

PAC Process Results Using a Heel with a Hydration Floor

| Batch No. | Final Sample Analysis | | | | Rx'n Time, hr |
|---|---|---|---|---|---|
| | %Al₂O₃ | %Cl | %Basicity | NTU | |
| 20 | 21.60 | 9.08 | 79.85 | 9.89 | 13.0 |
| 21 | 20.46 | 9.11 | 78.65 | 18.5 | 12.1 |
| 22 | --- | 9.19 | --- | 33.0 | 13.1 |
| 23 | 20.56 | 8.86 | 79.36 | 22.0 | 14.4 |
| 24 | 21.52 | 9.06 | 79.82 | 15.2 | 19.6 |
| 25 | 22.09 | 9.04 | 80.38 | 24.3 | 21.7 |
| 26 | 22.08 | 9.05 | 80.35 | 7.03 | 16.8 |
| 27 | 22.38 | 8.96 | 80.76 | 25.6 | 22.1 |
| 28 | 21.88 | 9.11 | 80.04 | 23.0 | 22.5 |
| 29 | 21.88 | 9.06 | 80.15 | 24.5 | 25.4 |
| 30 | 21.49 | 8.90 | 80.14 | 21.0 | 19.2 |
| 31 | 21.50 | 9.60 | 78.60 | 38.0 | 16.4 |
| 32 | 21.93 | 9.40 | 78.97 | 27.3 | 16.3 |
| 33 | 21.48 | 9.07 | 79.76 | 29.6 | 19.3 |
| 34 | 21.62 | 8.86 | 80.35 | 20.5 | 21.1 |
| 35 | 21.92 | 9.21 | 79.85 | 18.5 | 16.1 |
| | | | AVE | 22.4 | 18.1 |
| | | | STDEV | 7.9 | 3.9 |
| | | | 95% CI | 3.9 | 1.9 | produced aluminum chlorohydrate (ACH) is withdrawn from the reactor tank.

18 Claims, 2 Drawing Sheets

(56) References Cited

OTHER PUBLICATIONS

GEO Specialty Chemicals. "UltraPAC(R) 290", 2013. Accessed electronically at https://www.geosc.com/Assets/Files/Products-Docs/WTC-Product-Docs/UltraPac-290-2013.pdf on Apr. 17, 2025. (Year: 2013).*

Wikipedia, "Aluminium chlorohydrate", retrieved from https://en.wikipedia.org/wiki/Aluminium_chlorohydrate on Jul. 27, 2022, 4 pages.

International Search Report and Written Opinion of the International Searching Authority mailed Apr. 20, 2021 for PCT Application No. PCT/US2021/016751, 14 pages.

\* cited by examiner

| HCl Process Results Using a Heel with a Hydration Floor | | | | |
|---|---|---|---|---|
| | Final Sample Analysis | | | Rx'n |
| Batch No. | %Al$_2$O$_3$ | %Cl | %Basicity | NTU | Time, hr |
| 1 | 21.06 | 9.46 | 78.46 | 19.7 | 35.7 |
| 2 | 21.25 | 9.47 | 78.64 | 23.8 | 27.6 |
| 3 | 23.45 | 9.94 | 79.68 | 26.9 | 27.0 |
| 4 | 23.16 | 10.03 | 79.24 | 25.8 | 22.0 |
| 5 | 21.93 | 9.43 | 79.41 | 25.8 | 20.0 |
| 6 | 21.22 | 9.73 | 78.02 | 33.0 | 15.0 |
| 7 | 22.54 | 10.26 | 78.18 | 31.8 | 16.0 |
| 8 | 24.16 | 9.98 | 80.20 | 26.8 | 17.5 |
| 9 | 24.73 | 9.73 | 83.08 | 43.4 | 22.0 |
| 10 | 22.54 | 9.63 | 79.52 | 30.3 | 21.2 |
| 11 | 23.88 | 10.09 | 79.75 | 30.0 | 21.1 |
| 12 | 23.06 | 9.24 | 80.79 | 26.6 | 21.3 |
| 13 | 23.03 | 9.70 | 79.80 | 26.0 | 17.5 |
| 14 | 25.64 | 10.67 | 80.05 | 37.6 | 17.3 |
| 15 | 22.09 | 9.70 | 78.95 | 46.2 | 15.0 |
| 16 | 22.02 | 9.19 | 79.79 | 38.5 | 24.1 |
| 17 | 22.14 | 9.25 | 79.97 | 27.9 | 21.3 |
| 18 | 23.63 | 9.87 | 79.97 | 36.2 | 20.3 |
| 19 | 22.10 | 9.31 | 79.81 | 32.4 | 19.0 |
| | | | AVE | 31.0 | 21.1 |
| | | | STDEV | 6.84 | 4.99 |
| | | | 95% CI | 3.1 | 2.2 |

| PAC Process Results Using a Heel with a Hydration Floor | | | | |
|---|---|---|---|---|
| | Final Sample Analysis | | | Rx'n |
| Batch No. | %Al$_2$O$_3$ | %Cl | %Basicity | NTU | Time, hr |
| 20 | 21.60 | 9.08 | 79.85 | 9.89 | 13.0 |
| 21 | 20.46 | 9.11 | 78.65 | 18.5 | 12.1 |
| 22 | --- | 9.19 | --- | 33.0 | 13.1 |
| 23 | 20.56 | 8.86 | 79.36 | 22.0 | 14.4 |
| 24 | 21.52 | 9.06 | 79.82 | 15.2 | 19.6 |
| 25 | 22.09 | 9.04 | 80.38 | 24.3 | 21.7 |
| 26 | 22.08 | 9.05 | 80.35 | 7.03 | 16.8 |
| 27 | 22.38 | 8.96 | 80.76 | 25.6 | 22.1 |
| 28 | 21.88 | 9.11 | 80.04 | 23.0 | 22.5 |
| 29 | 21.88 | 9.06 | 80.15 | 24.5 | 25.4 |
| 30 | 21.49 | 8.90 | 80.14 | 21.0 | 19.2 |
| 31 | 21.50 | 9.60 | 78.60 | 38.0 | 16.4 |
| 32 | 21.93 | 9.40 | 78.97 | 27.3 | 16.3 |
| 33 | 21.48 | 9.07 | 79.76 | 29.6 | 19.3 |
| 34 | 21.62 | 8.86 | 80.35 | 20.5 | 21.1 |
| 35 | 21.92 | 9.21 | 79.85 | 18.5 | 16.1 |
| | | | AVE | 22.4 | 18.1 |
| | | | STDEV | 7.9 | 3.9 |
| | | | 95% CI | 3.9 | 1.9 |

FIG. 1

Comparative Results HCl Process with and without ACH Heel

| Batch No. | Heel | %Al$_2$O$_3$ | %Cl | %Basicity | NTU |
|---|---|---|---|---|---|
| | | Final Sample Analysis | | | |
| 36 | Yes | 22.98 | 9.91 | 79.32 | 37.0 |
| 37 | Yes | 24.61 | 10.31 | 79.93 | 36.0 |
| 38 | Yes | 24.14 | 10.34 | 79.47 | 47.1 |
| 39 | No | 21.94 | 9.82 | 78.54 | 64.6 |

Comparative Results PAC Process with and without ACH Heel

| Batch No. | Heel | %Al$_2$O$_3$ | %Cl | %Basicity | NTU |
|---|---|---|---|---|---|
| | | Final Sample Analysis | | | |
| 40 | Yes | 22.44 | 9.37 | 79.98 | 43.8 |
| 41 | Yes | 22.56 | 9.60 | 79.60 | 38.5 |
| 42 | Yes | 23.15 | 9.62 | 80.08 | 29.9 |
| 43 | No | 22.39 | 9.37 | 79.94 | 73.3 |

FIG. 2

SYSTEM AND METHOD FOR MANUFACTURING ALUMINUM CHLOROHYDRATE

FIELD

The present disclosure relates generally to a system and method for preparing aluminum chlorohydrate (ACH) using aluminum pellets.

BRIEF DESCRIPTION OF THE DRAWINGS

Implementations of the present technology will now be described, by way of example only, with reference to the attached figures, wherein:

FIG. 1 comprises a pair of tables depicting comparative data collected in accordance with the present disclosure demonstrating the surprisingly superior utility of polyaluminum chloride (PAC) over hydrochloric acid in the batch preparation process of aluminum chlorohydrate (ACH); and FIG. 2 comprises a pair of tables depicting comparative data demonstrating the surprisingly beneficial effect(s) of retaining a "heel" of reactant fluid covering retained, unreacted, aluminum pellets between batches of aluminum chlorohydrate (ACH) production, and especially when the reactant fluid is polyaluminum chloride-based, as compared to hydrochloric acid-based.

DETAILED DESCRIPTION

Polyaluminum chloride (PAC) is the name given to the family of compounds defined by the formula:

$$Al_m(OH)_nCl_{3m-n}$$

Where $0<n\leq 3$ m and where $m\geq 1$. The degree of neutralization (i.e., the hydroxide (OH) to aluminum (Al) ratio) is known as the basicity of the composition. In the case of polyaluminum chlorides (PAC), the basicity is defined by the formula n/3 m.

The solution chemistry of polyaluminum chlorides (PAC) is complex. In this regard, the formation of polynuclear aluminum species has been studied for over a century. In general, these materials are known to form a variety of oligomers and polymers in solution that are, among other purposes, useful as coagulants for water treatment applications. Basicity is a major factor in determining the molecular species distribution; low-basicity favors low molecular weight species and high-basicity favors high molecular weight species.

Polyaluminum chlorides (PAC) can be broadly divided into three basicity groups based on the manufacturing technique(s) used for their production. (1) Low-basicity PAC having basicity from about 1% to about 45% is manufactured by the well-known reaction of aluminum trihydrate ($Al_2O_3\cdot 3H_2O$) with hydrochloric acid (HCl) or aluminum chloride ($AlCl_3$). (2) High-basicity PAC having basicity of about 45% to about 65% can be manufactured by two methods. The first method, which is known as the neutralization process, relies on the reaction of aluminum chloride ($AlCl_3$) or low-basicity PAC with a base. The second method, which is known as the oxidation process, relies on the reaction of hydrochloric acid (HCl), aluminum chloride ($AlCl_3$) or low-basicity PAC with aluminum metal (Al). (3) Ultra-high-basicity PAC having basicity of about 65% to about 83% is manufactured by the oxidation process; that is, the reaction of hydrochloric acid (HCl), aluminum chloride ($AlCl_3$) or low-basicity PAC with aluminum metal (Al). The highest basicity PAC of commercial interest is polyaluminum chloride having about 83% basicity and which is known as aluminum chlorohydrate (ACH) with an empirical formula of $Al_2(OH)_5Cl$ while polyaluminum chloride (PAC) is more typically characterized by the empirical formula of $Al_2(OH)_3Cl_3$. In the reactions of the present disclosure, the polyaluminum chloride (PAC) has been optimized to the empirical formula represented as $Al_2(OH)_{2.5}Cl_{3.5}$ in Equation 2, below.

When considering these conventional processes for manufacturing PAC, high-basicity and ultra-high-basicity products are more costly to manufacture than low basicity products. The greater cost of the high and ultra-high basicity polyaluminum chlorides (PAC) is due to the relatively high cost of the aluminum metal utilized in the oxidation process, as compared to other possible sources of aluminum, such as aluminum hydrate. Therefore, an advantage has been realized to be able to prepare aluminum chlorohydrate (ACH) as disclosed herein by a process in which at least a portion of the aluminum comes from using polyaluminum chloride (PAC) as a reactant material with aluminum metal (Al).

Below, are three idealized reactions for producing aluminum chlorohydrate (ACH) by the oxidation of aluminum metal (Al).

$$2Al + HCl + 5H_2O \rightarrow Al_2(OH)_5Cl + 3H_2 \qquad \text{(Equation 1)}$$

$$10Al + 2Al_2(OH)_{2.5}Cl_{3.5} + 30H_2O \rightarrow 7Al_2(OH)_5Cl + 15H_2 \qquad \text{(Equation 2)}$$

$$5Al + AlCl_3 + 15H_2O \rightarrow 3Al_2(OH)_5Cl + 15/2 H_2 \qquad \text{(Equation 3)}$$

Referring to these three idealized reactions to produce aluminum chlorohydrate (ACH), the first equation (Equation 1) characterizes the conventional production of aluminum chlorohydrate (ACH) ($Al_2(OH)_5Cl$) by the oxidation of aluminum metal (Al) in the presence of hydrochloric acid (HCl). Equation 2 illustrates the use of low basicity polyaluminum chloride (PAC) ($Al_2(OH)_{2.5}Cl_{3.5}$), instead of hydrochloric acid, to produce aluminum chlorohydrate (ACH). Equation 3 illustrates the use of aluminum chloride ($AlCl_3$), instead of hydrochloric acid, to produce aluminum chlorohydrate (ACH).

Based on these idealized equations, the percentage of aluminum sourced from polyaluminum chloride (PAC) or aluminum chloride ($AlCl_3$) in the reactions (instead of hydrochloric acid) can be compared relative to having all of the aluminum in produced ACH being sourced from aluminum metal (Al), as a reactant. Referring to Equation 2, 28.6% of the aluminum ($Al_2$) in the produced ACH ($Al_2(OH)_5Cl$) comes from the reactant, polyaluminum chloride (PAC) ($Al_2(OH)_{2.5}Cl_{3.5}$). Referring to Equation 3, 16.7% of the aluminum ($Al_2$) in the produced ACH ($Al_2(OH)_5Cl$) comes from the reactant, aluminum chloride ($AlCl_3$).

From a molar point of view, in the case of Equation 1, two moles of aluminum metal (Al) are required to produce one mole of ACH ($Al_2(OH)_5Cl$) {i.e., a 2 to 1 ratio—2÷1=2}. In the case of Equation 2, ten moles of aluminum metal (Al) is required to produce seven moles of ACH ($Al_2(OH)_5Cl$) {i.e., a 10 to 7 ratio—10÷7=1.42}. In the case of Equation 3, five moles of aluminum metal (Al) is required to produce three moles of ACH ($Al_2(OH)_5Cl$) {i.e., a 5 to 3 ratio—5÷3=1.67}. In this sense, the lower the ratio, the better. Accordingly, less aluminum metal (Al) is required to produce the same amount of aluminum chlorohydrate (ACH) ($Al_2(OH)_5Cl$) using either of the reactions of Equations 2 or 3 than the reaction of Equation 1. These reactive relationships give rise to the presently appreciated economic advantage of using the approaches in either of Equations 2 and 3 over that of Equation 1. That is, aluminum metal (Al) reacted with hydrochloric acid (HCl) as in Equation 1 is more costly as an aluminum source to produce the same amount of aluminum chlorohydrate (ACH) than either aluminum metal (Al) reacting with polyaluminum chloride PAC ($Al_2(OH)_{2.5}Cl_{3.5}$) as in Equation 2 or aluminum metal (Al) reacting with aluminum chloride ($AlCl_3$) as in Equation 3. However, given these ratios, the reaction of Equation 2 most advantageously produces aluminum chlorohydrate (ACH) via the use of polyaluminum chloride (PAC) in the form $Al_2(OH)_{2.5}Cl_{3.5}$ reacted with aluminum metal (Al) and water ($H_2O$).

Any of the three reactions evidenced by the equations above to produce aluminum chlorohydrate (ACH) can utilize, as a source aluminum metal (Al), one or more of (1) aluminum ingot, (2) aluminum shot/pellets, and (3) aluminum powder. The reaction time, under otherwise similar conditions, is dependent on the surface area of the aluminum source, the greater of which is provided by aluminum powder, but aluminum powder has drawbacks related to handling and safety. Considering these different forms of aluminum, production times to make ACH are on the order of five to eight days using aluminum ingot; about a day using aluminum shot or pellets; and several hours using aluminum powder. Logically, it is desirable to utilize a process with a reaction time approaching that for aluminum powder, but without the safety hazards associated with aluminum powder such as dust, fire, and/or explosion. Aluminum shot/pellets are easier to handle than aluminum powder and are much safer, but traditionally their use as a reactant in the aluminum chlorohydrate (ACH) production process has been thought of as unpredictable and can produce high turbidity ACH that requires extensive settling and filtration. As used herein, turbidity is the measure of the relative clarity of a fluid. It is an optical characteristic of the fluid and is a measurement of the amount of light that is scattered by suspended material in the fluid when a light is shined therethrough. The unit by which turbidity is measured is stated as NTU, or Nephelometric Turbidity Units.

The present disclosure addresses the continuing need to provide a reaction system to manufacture aluminum chlorohydrate (ACH) that is easily reproduced and that has relatively fast reaction times. This disclosure also addresses the need to produce aluminum chlorohydrate (ACH) without having to use specialized catalysts that negatively impact the cost and/or purity profile of the end product.

Among other things, the present disclosure describes ACH production processes that utilize aluminum pellets reacted with polyaluminum chloride (PAC) instead of the conventionally employed hydrochloric acid. Independent of the disclosed improvement of using polyaluminum chloride (PAC) to react with aluminum metal (Al) in the ACH production process, utilization of a product heel has also been discovered. In this regard, it should be appreciated that at the end of each batch in the batch process to produce aluminum chlorohydrate (ACH), the resulting ACH fluid is pumped from the reactor tank, while some of the unreacted aluminum pellets making up the pellet bed at the bottom of the reactor are retained in the reactor for reaction in the next batch run. The aluminum pellets can be supported on a slightly elevated support platform, typically constructed from fiberglass, and having through-passages that permit the reaction fluid to circulate around the pellets, fostering contact and reaction therebetween.

The product heel takes the form of a retained amount of produced ACH fluid, at the end of a production batch, sufficient to cover and keep the retained, unspent portions of the aluminum pellets submerged in the fluid until the next production batch begins. The simplicity and advantages of using such a product heel are surprising. Among other benefits, the adaptation of retaining a product heel between production batches produces an ACH product that is substantially lower in turbidity as compared to otherwise similar reaction conditions using hydrochloric acid and/or no product heel. In a related aspect, instead of the heel comprising (including, but not necessarily limited to) produced and retained aluminum chlorohydrate (ACH), water can be input into the reactor, covering the pellet bed and similarly preventing contact between the aluminum pellets and the atmosphere (air). The use of this "water heel" is appropriate to "shutdown" the reactor as it effectively stops the reaction, but at the same time preserves the aluminum pellet bed for future reaction.

The discovery of using such an ACH product heel occurred during experimentation on the batch process. In this regard, it was observed that reactivity at the exterior surfaces of the pellets of the residual pellet bed exposed to the atmosphere during the reactor's pump-out (and left exposed until introduction of the next set of reactant materials) remained quite active. This exposure to air in the atmosphere resulted in the undesirable formation of a white crust of what is believed to be a complex mixture of crystallized ACH and higher basicity byproduct materials on the exterior surfaces of the pellets during the time that the pellets were not covered by reactant fluid between batches. Subsequently, the crust hardened and became more or less a barrier between the retained aluminum pellets from the previous batch and newly introduced PAC reactant for the next batch process. The white byproduct material was found to also contribute to high turbidity of the produced ACH. As a result of experimentation investigating ways to combat these negative effects, it was discovered that leaving such a product heel (enough of the reactant fluid to cover the remaining pellets in the reactor) of produced ACH during product pump-out, and between batches, caused the process to become more stable, to produce less turbidity in the produced aluminum chlorohydrate (ACH) and not to form such a barrier-crust (or at least to a lesser extent) on the residual pellet bed.

In support of using polyaluminum chloride (PAC) instead of hydrochloric acid (HCl) in the aluminum chlorohydrate (ACH) production batches, a comparative trial of nineteen (19) reactions (batches) were conducted in which aluminum metal pellets were combined with aqueous hydrochloric acid in a 12,000 gallon fiberglass reactor fitted with a static support platform. Each batch began with an amount of partially-spent aluminum metal pellets covered by an ACH product heel weighing approximately 12,000 lbs and that remained from the previous batch. To this, about 16,000 lbs of water was added and enough ⅜" aluminum pellets to total about 15,000 lbs of aluminum. The reactor was steam-heated to about 190° F. and a total of about 40,500 lbs of 12.5% hydrochloric acid (HCl) was added in several increments. The reactor reached boiling temperature and was held there for a total of 21.2 hrs while water was added semi-continuously to maintain the reactor volume during steam/hydrogen evolution. At the end of each batch, the produced aluminum chlorohydrate (ACH) product was sampled and transferred to storage, but each time enough of a product heel was retained in the reactor to cover the remaining unreacted pellets with that ACH product liquid. Data produced in this 19-batch trial is recorded in the left-hand table of FIG. 1 as Batch Nos. 1-19.

In addition to the 19-batch trial described above, an experiment of sixteen (16) reactions (batches) was conducted in which aluminum metal pellets were combined with polyaluminum chloride (PAC), instead of hydrochloric acid, in a 12,000 gallon fiberglass reactor fitted with a static support platform. Each batch began with an amount of partially-spent aluminum metal pellets covered by an ACH product heel weighing approximately 12,000 lbs that remained from the previous batch. To this, about 21,000 lbs of water was added and enough ⅜" aluminum pellets to total about 13,000 lbs of aluminum. The reactor was steam-heated to about 190° F. and a total of about 27,500 lbs of polyaluminum chloride (PAC) solution comprising 17% $Al_2O_3$, 21% chloride, and 40.8% basicity was added in several increments. The reactor reached boiling temperature and was held there for a total of 16.3 hrs while water was added semi-continuously to maintain the reactor volume during steam/hydrogen evolution. At the end of each batch, the produced aluminum chlorohydrate (ACH) product was sampled and transferred to storage, but each time enough of a product heel was retained in the reactor to cover the remaining unreacted pellets with that ACH product liquid. Data produced in this 16-batch experiment is recorded in the right-hand table of FIG. 1 as Batch Nos. 20-35.

A further experiment was conducted in which several batches similar to those described in the PAC-based 16-batch experiment immediately above were processed, but the next to last batch was drained completely of ACH product without retaining an ACH heel, thereby exposing the partially reacted aluminum pellets to the atmosphere until the reactants of the last batch were input to the reactor. The results of the experiment are recorded in the right-hand table of FIG. 2 as Batch Nos. 40-43. For substantially similar batches utilizing polyaluminum chloride (PAC), the turbidity of the produced aluminum chlorohydrate (ACH) was significantly greater when no product heel was utilized as recorded in the right-hand table of FIG. 2 as Batch No. 43, having a NTU value of 73.3. This is in stark contrast to the three preceding batches that did utilize a product heel and for which the NTU values of 43.8, 38.5 and 29.9 were recorded for the Batch Nos. 40-42, respectively.

Still a further trial was conducted in which a number of batches similar to those described in the HCl-based 19-batch trial were processed, but the next to last batch was drained completely of ACH product without retaining any ACH heel thereby exposing the partially reacted aluminum pellets to the atmosphere until the reactants of the last batch were input to the reactor. The results of the experiment are recorded in the left-hand table of FIG. 2 as Batch Nos. 36-39. For substantially similar batches utilizing hydrochloric acid (HCl), the turbidity of the produced aluminum chlorohydrate (ACH) was significantly greater when no product heel was utilized as recorded in the left-hand table of FIG. 2 as Batch No. 39, having a NTU value of 64.6. This is again in stark contrast to the three preceding batches that did utilize a product heel and for which the NTU values of 37.0, 36.0 and 47.1 were recorded for the Batch Nos. 36-38, respectively.

As demonstrated in the disclosure above and the tables of associated FIGS. 1 and 2, the use of polyaluminum chloride (PAC), instead of hydrochloric acid, produced unexpected results in a number of quality parameters of the produced aluminum chlorohydrate (ACH), as well as in characteristics of the reaction, itself, used to produce ACH. In one aspect, the overall turbidity of the produced aluminum chlorohydrate (ACH), as measured by NTU (Nephelometric Turbidity Units), is improved by an average of 8.6 NTU (22.4 NTU compared to 31.0 NTU) when using polyaluminum chloride (PAC) as compared to hydrochloric acid (HCl) in the batch production of the ACH. In another aspect, the average batch reaction time is also improved by about 3 hours (18.1 hour compared to 21.1 hour) by the use of polyaluminum chloride (PAC) in place of hydrochloric acid (HCl), which is about a fifteen percent improvement over the required reaction time when hydrochloric acid is utilized. In support of these findings, FIG. 1 shows these results to be statistically significant with a 95% confidence interval.

Stabilizing the Support Platform

During the reaction between aluminum pellets and either hydrochloric acid or polyaluminum chloride (PAC), the system rapidly evolves hydrogen gas bubbles at the surface of the pellets as demonstrated by the three idealized reaction Equations included above; each depicting relatively large amounts of hydrogen gas ($H_2$) being produced at the right-hand sides of the reactions. Through study of the reaction's activity in the reactor, it has been discovered that substantial portions of the produced hydrogen gas ($H_2$) adhere to the pellets for an amount of time sufficient to impart a buoyant effect on the pellet bed. Still further, as a batch reaction progresses, the specific gravity of the liquid phase reactants surrounding the pellet bed slowly increases as more ACH product is formed, resulting in a produced solution having an increasing specific gravity up to as much as about 1.30-1.38, or higher, depending on the final aluminum (Al) concentration in the solution.

A support platform for the pellet bed is utilized that is typically constructed from material similar to that used for the reactor body; namely epoxy/fiberglass having a specific gravity of about 1.07-1.10. In at least one embodiment, the support platform resembles a short-legged table having a support deck with perforations therethrough that encourage circulation of reaction solution about the pellet bed that is resting on a top surface of the support deck. This promotes contact of the solution on the exterior surfaces of individual aluminum pellets, after which the solution passes down through the perforations into an established gap-space under the support deck. This solution has been further enriched with produced aluminum chlorohydrate (ACH) by its passage across the pellet bed and is ready for further enriching circulation.

Typically, the support platform is comprised of sections that fit together to form the platform because the platform in an assembled configuration is too large to pass through any openings into the reactor. One such support platform is described as a hydration floor in United States Published Patent Application 2020/0398242 A1, the disclosure of which is incorporated herein by reference, in its entirety.

In the form described immediately above, it has been observed that the support platform eventually becomes structurally compromised by the various and cycling forces acting thereupon during operation. First, considering an individual batch run, an increasing downwardly directed force is exerted on the support platform under the weight of the aluminum pellets as they are loaded thereon. This is followed by the progressive lightening of the pellet bed as the metal reacts with the polyaluminum chloride (PAC) and the aluminum (Al) goes into solution as a component of the ever-increasing, produced aluminum chlorohydrate (ACH). This action has a compounding effect; not only is the aluminum metal (Al) reacting off of the pellets causing them to become lighter, but as the batch reaction progresses in the reactor, the concentration of aluminum chlorohydrate (ACH) is increasing. This raises the specific gravity of the solution surrounding the pellet bed and the support platform to as much as about 1.30-1.38, or higher. Additionally, when the buoyant effect of the produced hydrogen gas ($H_2$) is considered, together with the lesser specific gravity of the support platform compared to high-concentrate ACH (about 1.1 compared to about 1.3), the successive cycling of forces on the support platform across multiple batches of ACH production causes the support platform to deteriorate, and eventually fail, normally by collapse. The support platform has even been observed to float up, off the floor of the reactor, into the produced ACH solution during late stages of individual batch processes.

Because the support platform is made up of joined-together modules or component parts, sometimes secured together only by friction-fit, they tend to come apart under these cycling forces that are sometimes sufficient to cause flexion of the support platform, and even movement of the support platform within the reactor if floating occurs. If no measures are taken to minimize or prevent this flexing and/or floating of the support platform, at some point a portion of the modular platform breaks away. Once that happens, the rest of the platform easily comes apart, as there are no more fasteners to link the entire platform together. Based on experience, after running the process for a while, the platform gives way and becomes completely disengaged from the reactor bottom.

Two simple, but elegant solutions have been invented to combat the cycling of forces on the support platform. The first method is to choose a material for the support platform's construction that has a specific gravity approximating or greater than that of the expected final ACH product solution. This can be accomplished by making the support platform out of a type of material with a specific gravity approaching or greater than about 1.3. A second method is remedial in nature; it is accomplished by placing one or more counterbalancing weights on the support platform that are chosen to assure that the cumulative forces acting on the platform throughout an ACH manufacturing batch process keep the platform biased downward. As one example, it has been found that the placement of a 50-lb rubber-coated weight, or the like, on each section of the platform described in United States Published Patent Application 2020/0398242 A1 is sufficient.

In view of the detailed disclosure provided hereinabove, exemplary embodiments of the presently disclosed technology are described hereinbelow. In one example, the present technology takes the form of a method of batch manufacturing aluminum chlorohydrate (ACH) utilizing a reactor tank. The method comprises (includes, but is not limited to) conducting two consecutive batch manufacturing processes, each batch manufacturing process producing aluminum chlorohydrate (ACH) by reacting solid-state aluminum metal pieces with an acid source in a reactor tank. Exemplarily, the solid-state aluminum metal pieces can take the form of aluminum pellets. Proximate the end of a first of the two batch manufacturing processes, after the aluminum chlorohydrate (ACH) being produced in that batch has reached a predetermined basicity level, a majority of the produced aluminum chlorohydrate (ACH) is withdrawn from the reactor tank but a heel-portion of the produced aluminum chlorohydrate (ACH) is retained in the reactor tank. The heel-portion comprises a sufficient amount of the produced aluminum chlorohydrate (ACH) to submerge therein a majority of unreacted solid-state aluminum metal pieces retained in the reactor tank at the time that produced aluminum chlorohydrate (ACH) is withdrawn (pumped) from the reactor tank.

The unreacted solid-state aluminum metal pieces (aluminum pellets) remain in the reactor tank submerged in a solution comprising (including, but not necessarily limited to) produced aluminum chlorohydrate (ACH) until a second of the two consecutive batch manufacturing processes can be initiated. More specifically, a substantial (a term defined herein as permitting up to 10% deviation) entirety of the retained, unreacted solid-state aluminum metal pieces (pellets) are maintained in the reactor tank submerged in the solution that comprises the heel-portion of produced aluminum chlorohydrate (ACH). Still further, and optional but advantageous, water is added to the retained heel-portion of ACH in the reactor tank soon after (typically within minutes) the majority of produced ACH is pumped from the reactor at a batch's conclusion. The addition of water serves to cool the retained heel-portion of ACH and the unspent aluminum pellets, thereby impeding further reaction of the ACH with the pellets. From the perspective of producing aluminum chlorohydrate (ACH) in successive batches, this addition of water is considered the start of the next succeeding batch. In this regard, the water-diluted heel-portion of ACH covers the unspent aluminum pellets until a second of the two consecutive batch manufacturing processes is initiated, thereby substantially preventing air-exposure to the unreacted solid-state aluminum metal pieces between the first and second of the two consecutive batch manufacturing processes. Alternatively, if a second (next) batch is not going to immediately occur, the addition of water impedes and effectively stops the reaction until batch re-start is desired.

In this manner, the formation of the white crust of byproduct materials (which has been previously observed to have detrimental effect on the reaction as it forms a barrier between the reactants) is prevented on exterior surfaces of the unreacted solid-state aluminum metal pieces. Beneficially, and as a result, average turbidities of about 22 NTU are achieved in the produced aluminum chlorohydrate (ACH) in the second of the two consecutive batch manufacturing processes. In similar exercises, average turbidities of less than about 30 NTU and less than about 25 NTU have been achieved in the produced aluminum chlorohydrate (ACH) in the second of the two consecutive batch manufacturing processes. Considering the 16 example batches represented in the right-hand table of FIG. 1, advantageous turbidities of between 7.03 and 29.6 NTU were achieved in the produced aluminum chlorohydrate (ACH) in the second of the two consecutive batch manufacturing processes.

Solid-state aluminum metal pieces in the form of aluminum pellets are added to the reactor tank containing the water-diluted heel solution at the beginning of each of the two batch manufacturing processes, thereby forming a pellet bed on a support platform proximate a bottom of the reactor tank.

Proximate the beginning of each batch, the acid source is input into the reactor tank, thereby initiating the batch's production of aluminum chlorohydrate (ACH) and wherein the acid source is high-basicity polyaluminum chloride (PAC) having a basicity of about 1% to about 50%, and more specifically, about 35% to about 45%. The high-basicity polyaluminum chloride (PAC) has the approximated empirical formulation of $Al_2(OH)_{2.5}Cl_{3.5}$ (which has a basicity of 41.7%) and is a source of aluminum in the manufacturing process producing aluminum chlorohydrate (ACH) according to the following approximated reaction:

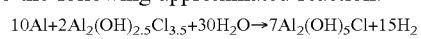
$$10Al + 2Al_2(OH)_{2.5}Cl_{3.5} + 30H_2O \rightarrow 7Al_2(OH)_5Cl + 15H_2$$

Each batch manufacturing process producing aluminum chlorohydrate (ACH) is permitted to react until a predetermined basicity of about 65% to about 83% is achieved, and advantageously, until a predetermined basicity between about 80% to about 85% is achieved.

Beneficially, the predetermined basicity of between about 80% and about 85% is achieved on average in about 18 hours (see the right-hand table of FIG. 1) after the batch manufacturing process is initiated. Importantly, this favorably compares to an average of about 21 hours (see the left-hand table of FIG. 1) when conventional hydrochloric acid is utilized.

The following are exemplary claims that are within the scope of this disclosure. Other, different and/or broader embodiments are also within the scope of this disclosure, some of which can include elements of one example embodiment combined with elements of another example embodiment (to the extent combinable), or subsets of elements of one specific example embodiment.

What is claimed is:

1. A method of batch manufacturing aluminum chlorohydrate (ACH) utilizing a reactor tank comprising:
   conducting two consecutive batch manufacturing processes, each batch manufacturing process producing aluminum chlorohydrate (ACH) by reacting solid-state aluminum metal pieces with an acid source in a reactor tank;
   proximate the end of a first of the two batch manufacturing processes, after the aluminum chlorohydrate (ACH) being produced in that batch has reached a predetermined basicity level, withdrawing a majority of the produced aluminum chlorohydrate (ACH) from the reactor tank but retaining a heel-portion of the produced aluminum chlorohydrate (ACH) in the reactor tank, wherein the heel-portion comprises a sufficient amount of the produced aluminum chlorohydrate (ACH) to submerge therein a majority of unreacted solid-state aluminum metal pieces retained in the reactor tank at the time that produced aluminum chlorohydrate (ACH) is withdrawn from the reactor tank; and
   maintaining a substantial entirety of the retained, unreacted solid-state aluminum metal pieces in the reactor tank submerged in produced aluminum chlorohydrate (ACH) until a second of the two consecutive batch manufacturing processes is initiated and thereby substantially preventing air-exposure to the unreacted solid-state aluminum metal pieces between the first and second of the two consecutive batch manufacturing processes being conducted.

2. The method of claim 1, further comprising:
   preventing formation of a white crust of byproduct material on exterior surfaces of the unreacted solid-state aluminum metal pieces and thereby achieving an average turbidity of about 22 NTU of produced aluminum chlorohydrate (ACH) in the second of the two consecutive batch manufacturing processes.

3. The method of claim 1, further comprising:
   preventing formation of a white crust of byproduct materials on exterior surfaces of the unreacted solid-state aluminum metal pieces and thereby achieving an average turbidity of less than about 30 NTU of produced aluminum chlorohydrate (ACH) in the second of the two consecutive batch manufacturing processes.

4. The method of claim 1, further comprising:
   preventing formation of a white crust of byproduct on materials exterior surfaces of the unreacted solid-state aluminum metal pieces and thereby achieving an average turbidity of less than about 25 NTU of produced aluminum chlorohydrate (ACH) in the second of the two consecutive batch manufacturing processes.

5. The method of claim 1, further comprising:
   preventing formation of a white crust of byproduct materials on exterior surfaces of the unreacted solid-state aluminum metal pieces and thereby achieving a turbidity of between 7.03 and 29.6 NTU of produced aluminum chlorohydrate (ACH) in the second of the two consecutive batch manufacturing processes.

6. The method of claim 1, further comprising:
   adding solid-state aluminum metal pieces in the form of aluminum pellets to the reactor tank at the beginning of each of the two batch manufacturing processes and thereby forming a pellet bed on a support platform proximate a bottom of the reactor tank.

7. The method of claim 1, further comprising:
   inputting, at a beginning of each batch, the acid source into the reactor tank and thereby initiating the batch's production of aluminum chlorohydrate (ACH), wherein the acid source is high-basicity polyaluminum chloride (PAC) having a basicity of about 35% to about 45%.

8. The method of claim 7, wherein the high-basicity polyaluminum chloride (PAC) has the empirical formulation of $Al_2(OH)_{2.5}Cl_{3.5}$ and is a source of aluminum in the manufacturing process producing aluminum chlorohydrate (ACH) according to the approximated reaction:

$$10Al+2Al_2(OH)_{2.5}Cl_{3.5}+30H_2O \rightarrow 7Al_2(OH)_5Cl+15H_2.$$

9. The method of claim 8, further comprising:
   permitting each batch manufacturing process producing aluminum chlorohydrate (ACH) to react until a predetermined basicity of about 65% to about 83% is achieved.

10. The method of claim 8, further comprising:
    permitting each batch manufacturing process producing aluminum chlorohydrate (ACH) to react until a predetermined basicity between about 80% to about 85% is achieved.

11. The method of claim 10, wherein the predetermined basicity between about 80% to about 85% is achieved on average in about 18 hours after the batch manufacturing process is initiated.

12. The method of claim 1, wherein the acid source is chosen from the group comprising: (1) a polyaluminum chloride (PAC) type material, (2) $AlCl_3$ and (3) hydrochloric acid.

13. The method of claim 12, wherein the acid source is a polyaluminum chloride (PAC) type material having an aluminum/chloride molar ratio of from 0.36 to 1.15 and having an aluminum concentration of at least 5% $Al_2O_3$.

14. The method of claim 6, wherein the aluminum pellets are approximately spherical in shape and have a diameter of from 0.180 to 0.500 inches.

15. The method of claim 6, further comprising:
    adding water ahead of adding the aluminum pellets to the reactor tank at the beginning of the second of the two batch manufacturing processes.

16. The method of claim 1, further comprising:
    adding water ahead of adding aluminum pieces to the reactor tank at the beginning of the second of the two batch manufacturing processes.

17. The method of claim 7, further comprising:
adding water ahead of adding aluminum pieces to the reactor tank at the beginning of the second of the two batch manufacturing processes.

18. The method of claim 12, further comprising:
adding water ahead of adding aluminum pieces to the reactor tank at the beginning of the second of the two batch manufacturing processes.

\* \* \* \* \*